(12) United States Patent
Ishihara et al.

(10) Patent No.: US 6,734,224 B2
(45) Date of Patent: May 11, 2004

(54) HEAT RADIATION SHIELD COATING COMPOSITION

(75) Inventors: Ryoji Ishihara, Kyotanabe (JP); Keita Mizutani, Suita (JP); Nobuto Fujii, Tokyo (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/788,571

(22) Filed: Feb. 21, 2001

(65) Prior Publication Data

US 2001/0029276 A1 Oct. 11, 2001

(30) Foreign Application Priority Data

Feb. 22, 2000 (JP) .......................................... 2000-44247

(51) Int. Cl.⁷ .............................. C08K 3/22; G21F 1/08; G21F 1/12; B32B 33/00
(52) U.S. Cl. ...................... 523/136; 524/413; 524/430; 524/431; 524/493; 524/494; 428/689
(58) Field of Search .......................... 523/136; 524/413, 524/430, 431, 493, 494; 428/689

(56) References Cited

U.S. PATENT DOCUMENTS

| | | | |
|---|---|---|---|
| 4,424,292 A | * | 1/1984 | Ravinovitch et al. |
| 4,624,710 A | | 11/1986 | Modly |
| 4,895,904 A | | 1/1990 | Allingham |
| 5,540,998 A | * | 7/1996 | Yamada et al. |
| 5,739,204 A | * | 4/1998 | Piana |
| 5,814,434 A | * | 9/1998 | Nakamura et al. |
| 6,207,224 B1 | * | 3/2001 | O'Neil |

FOREIGN PATENT DOCUMENTS

JP          05-293434 A          11/1993

* cited by examiner

Primary Examiner—Tae H. Yoon
(74) Attorney, Agent, or Firm—Townsend & Banta (57) ABSTRACT

Disclosed is a heat radiation shield coating composition containing a black pigment which exhibits a reflectance of not below 8.0% relative to a solar radiation in the 780–2,100 nm wavelength region. The black pigment preferably exhibits a reflectance of not higher than 15% relative to a radiation at any wavelength in the 400–700 nm visible region.

15 Claims, 4 Drawing Sheets

HEAT RADIATION SHIELD COATING COMPOSITION

BACKGROUND OF THE INVENTION

1. Field of the Invention

The present invention relates to a heat radiation shield coating composition which can be applied onto roofs and outside walls of architectural structures, vehicles, ships, plants, sheds, cattle stalls and the like.

2. Description of Related Art

Coatings are applied onto various structures, such as roofs of architectural structures, to impart various color appearances thereto. However, carbon black, a typical black pigment for use in production of various color hues, tends to absorb a solar energy. This nature inevitably leads to elevation in temperature inside a structure having a coat formed from a carbon black containing composition, which impairs comfort of residential spaces and storage conditions of articles and also requires a huge energy consumption for air conditioning.

In Japanese Patent Laying-Open Nos. Hei 1-121371 (1989) and Hei 1-261466 (1989), the use of various metal oxide or mixed metal oxide pigments is disclosed for solar radiation shield pigments. Still, the use of conventional carbon black is necessary to obtain a coating that exhibits a high level of blackness, resulting in the reduced heat radiation shielding effect. Japanese Patent Laying-Open No. Hei 2-185572 (1990) proposes the use of a mixed oxide black pigment. This pigment however exhibits a solar radiation reflectance of below 8% and thus its heat radiation shielding effect is limited.

Japanese Patent Registration No. 2593968 and Japanese Patent Laying-Open No. Hei 05-293434 (1993) propose solar heat shield coating compositions colored in an achromatic black by blending chromatic pigments, such as red, orange, yellow, green, blue and purple pigments which exhibit high solar radiation reflectances in the ultraviolet and near infrared regions. However, prolonged use thereof likely results in problematic partial deterioration of those color pigments. This unbalances the initial color matching to cause a color change, which has been a problem.

SUMMARY OF THE INVENTION

It is an object of the present invention to provide a heat radiation shield coating composition containing a black pigment, which can form a coating film having a superior heat radiation shielding capability.

The heat radiation shield coating composition of the present invention contains a black pigment that exhibits a reflectance of not below 8.0% relative to a solar radiation in the 780–2,100 nm wavelength region.

Preferably, the black pigment exhibits a reflectance of not exceeding 15% to a radiation at any wavelength within the 400–700 nm visible region.

The black pigment may be a calcined pigment containing $Fe_2O_3$ and also $Cr_2O_3$ and/or $Mn_2O_3$ in the total amount of 20–100% by weight.

The heat radiation shield coating composition may contain the above-specified black pigment in the amount of not below 0.1% by weight. Preferably, the black pigment accounts for at least 0.5% of the total weight of all pigments.

The heat radiation shield coating composition may preferably contain, as a binder component, a polyester, acrylic, fluoro or chloro resin. It may further contain a melamine resin and/or blocked isocyanate, when needed. A heat radiation shielding plate of this invention is a plate coated with the above-specified heat radiation shield coating composition.

As stated above, the heat radiation shield coating composition of the present invention contains a black pigment that exhibits a reflectance of not below 8.0% relative to a solar radiation in the 780–2,100 nm wavelength region.

The black pigment for use in the heat radiation shield coating composition exhibits a reflectance of not below 8%, preferably not below 15.0%, relative to a solar radiation. The solar radiation reflectance, as used herein, is described in JIS A 5759 and is defined therein as the solar radiation reflectance weighted by an intensity of a solar radiation at each wavelength in the 780–2,100 nm region. If the solar radiation reflectance is below 8.0%, sufficient heat radiation shielding characteristics may not be obtained. Accordingly, in the case where a coating composition containing such a black pigment is utilized to provide coatings on roofs and outside walls of architectural structures, vehicles, ships, plants, sheds, cattle stalls and the like, such coatings may fail to achieve sufficient reduction of temperature inside those structures.

The black pigment, as used herein, refers to a pigment that has a black—dark brown appearance.

Preferably, the black pigment with the above-specified solar radiation reflectance is a calcined inorganic pigment which contains $Fe_2O_3$ and also $Cr_2O_3$ and/or $Mn_2O_3$ in the total amount of 20–100% by weight. Specifically, this calcined pigment is characterized as containing $Fe_2O_3$, as an essential ingredient, and also at least one of $Cr_2O_3$ and $Mn_2O_3$. These ingredients are preferably contained in the calcined pigment in the total amount of 20–100% by weight, more preferably of 30–100% by weight. If the total amount is below 20% by weight, the calcined pigment may exhibit an insufficient heat radiation shielding capability.

The above-described calcined pigment is generally manufactured via calcination at a temperature of at least 600° C. and the subsequent pulverization.

The heat radiation shield coating composition of the present invention contains the black pigment as an essential component, but may further contain other color, body or bright pigment depending upon the color hue, end purpose and performance sought for the resulting coating. In such a case, the coating composition preferably contains the black pigment in the amount of at least 0.1% by weight. If the amount is below 0.1% by weight, it may fail to exhibit a sufficient heat radiation shielding performance. Also, the black pigment preferably accounts for at least 0.5% of the total weight of all pigment components. With the higher loading thereof, the resulting coating can exhibit the increased heat radiation shielding capability compared to conventional coatings of the same color hue. If the proportion by weight of the black pigment is reduced to below 0.5%, the resulting coating with the same hue may fail to exhibit a sufficient heat radiation shielding performance.

As stated above, the heat radiation shield coating composition of the present invention may further contain other color pigment than the black pigment or other type of pigment such as a body or bright pigment.

The other color pigment is used to adjust a hue of a coating and may be an organic or inorganic color pigment. Examples of organic color pigments include phthalocyanine, azo, condensed azo, anthraquinone, perinone/perylene, indigo/thioindigo, isoindolinone, azomethineazo, dioxazine, quinacridone, aniline black, triphenylmethane pigments and the like. Examples of inorganic color pigments include titanium oxide, iron oxide, iron hydroxide, chrome oxide, calcined spinel pigments, lead chromate, chrome vermilion, iron blue pigments, aluminum powder, bronze powder and the like.

Examples of body pigments include calcium carbonate, barium sulfate, silicon oxide, aluminum hydroxide and the like. Other applicable body pigments include organic cross-linked particles and inorganic particles.

Examples of bright pigments include a mica pigment, an aluminum foil, a tin foil, a gold leaf, a stainless steel foil and a metal foil pigment such as of nickel, copper or the like.

The type and form of the heat radiation shield coating composition of the present invention is not particularly specified. Its type can be thermosetting, thermoplastic, ambient drying, ambient curable or radiation curable. It can be provided in a solvent-borne, water-borne, non-aqueous emulsion, solvent-free or powder form.

The coating composition of the present invention may also contain a binder component, examples of which include acrylic, alkyd, polyester, silicone-modified polyester, silicone-modified acrylic, epoxy, polycarbonate, silicate, fluoro and chloro resins. The use of a polyester, acrylic, fluoro or chloro resin, among those resins, is preferred.

When necessary, the coating composition may further contain a curing agent, examples of which include amino resins such as a melamine resin and crosslinking resins such as isocyanate and blocked isocyanate.

The heat radiation shield coating composition of the present invention may further contain a filler consisting of fine particles, an additive, a solvent and the like, when needed.

The type of the filler is not particularly specified. Examples of fillers include fine particles composed of $SiO_2$, $TiO_2$, $Al_2O_3$, $Cr_2O_3$, $ZrO_2$, $Al_2O_3 \cdot SiO_2$, $3Al_2O_3 \cdot 2SiO_2$, zirconia silicate or the like; finely divided fibrous or particulate glass and the like.

The type of the additive is not particularly specified. Useful additives are conventionally known in the art and include, for example, a flatting agent such as silica or alumina, defoamer, leveling agent, antisagging agent, surface control agent, viscosity control agent, dispersing agent, UV absorber, wax and the like.

Any type of solvent generally known to be useful for coatings can be used. Examples of solvents include aromatic hydrocarbons such as toluene, xylene, SOLVESSO 100 and SOLVESSO 150; esters such as ethyl acetate and butyl acetate; ketones such as methylethyl ketone, methylisobutyl ketone, cyclohexanone and isophorone; and water. The solvent used is suitably chosen from those listed above on the basis of solubility, evaporation rate and safety considerations. The above-listed solvents may be used alone or in any combination thereof.

The heat radiation shield coating composition contains the black pigment having the above-specified solar radiation reflectance under the consideration of a solar radiation intensity at each wavelength. It effectively reflects a near infrared radiation in the 780–2,100 nm wavelength region, which constitutes a primary heat source of a solar radiation. The composition thus becomes particularly effective when used to form a solar radiation shield coating film.

The following procedure can be utilized to prepare the coating composition of the present invention. The above-described black pigment is mixed in a pigment dispersing resin by means of a machinery generally used in the art to disperse pigments, such as a roller mill, paint shaker, pot mill, disper or sand grinding mill, to prepare a pigment-dispersed paste. The above-described binder, melamine resin and/or blocked isocyanate, additive, solvent and others are then added to the paste to provide a coating composition.

Various coating techniques and equipments generally known in the art can be utilized to apply the present coating composition, including dipping, brushing, a roller, a roll coater, an air spray, an airless spray, a curtain flow coater, a roller curtain coater, die coater and the like, for example. The coating technique may be suitably chosen depending upon the end purpose of the substrate used.

The heat radiation shielding plate of the present invention is the plate having a coating film formed from the coating composition of the present invention. The coating film formed thereon may be varied in thickness depending on the type and end use of the coating composition used, but has a dry thickness generally in the range of 5–300 μm.

The material type of a substrate to which the heat radiation shield coating composition of the present invention can be applied is not particularly limited, and include, for example, metals, plastics, inorganics and the like. Examples of metals include aluminum, iron, zinc plated steel, aluminum-zinc plated steel, stainless steel, tin and the like. Examples of plastics include acrylics, vinyl chloride, polycarbonates, ABS, polyethylene terephthalate, polyolefins and the like. Examples of inorganics include ceramics such as referred to in JIS A 5422 and A 5430, glass and the like.

The above-listed substrates may be surface treated to impart improved adhrerence or corrosion resistance thereto. Further, an undercoat may be applied thereover. Still further, a back coat may be applied over a back surface of the substrate.

DESCRIPTION OF THE PREFERRED EXAMPLES

Black Pigments

The following pigments were provided to use for the black pigment.

(1) Black Pigment A

A calcined composite oxide pigment containing, by weight, 75% of $Fe_2O_3$ and 25% of $Cr_2O_3$.

(2) Black Pigment B

A calcined composite oxide pigment containing, by weight, 40% of $Fe_2O_3$ and 60% of $Cr_2O_3$.

(3) Black Pigment C

A calcined composite oxide pigment containing, by weight, 80% of $Fe_2O_3$ and 20% of $Mn_2O_3$.

(4) Black Pigment D

A calcined composite oxide pigment containing, by weight, 15% of $Fe_2O_3$, 25% of $Cr_2O_3$, 15% of $Mn_2O_3$ and 45% of NiO.

(5) Black Pigment E

A calcined composite oxide pigment containing, by weight, 63% of $Cr_2O_3$, 5% of $MnO_2$ and 32% of CuO.

(6) Black Pigment F

A calcined composite oxide pigment containing, by weight, 59% of $Cr_2O_3$ and 41% of CuO.

(7) Black Pigment G

A calcined composite oxide pigment containing, by weight, 54% of $Fe_2O_3$, 28% of $MnO_2$ and 18% of CuO.

(8) Black Pigment H

A carbon black pigment ("Monarch 1300" designated in trade and manufactured by Cabot Co.)

A spectral reflectance was measured for each of the above-listed black pigments. Specifically, each pigment was dispersed in a binder at a concentration of 20–40 parts by weight (phr) to obtain a coating film (20–40 $\mu$m thick) which was subsequently subjected to measurement by a Hitachi Seisakusho spectrophotometer (model number U-3500).

Figure 3:
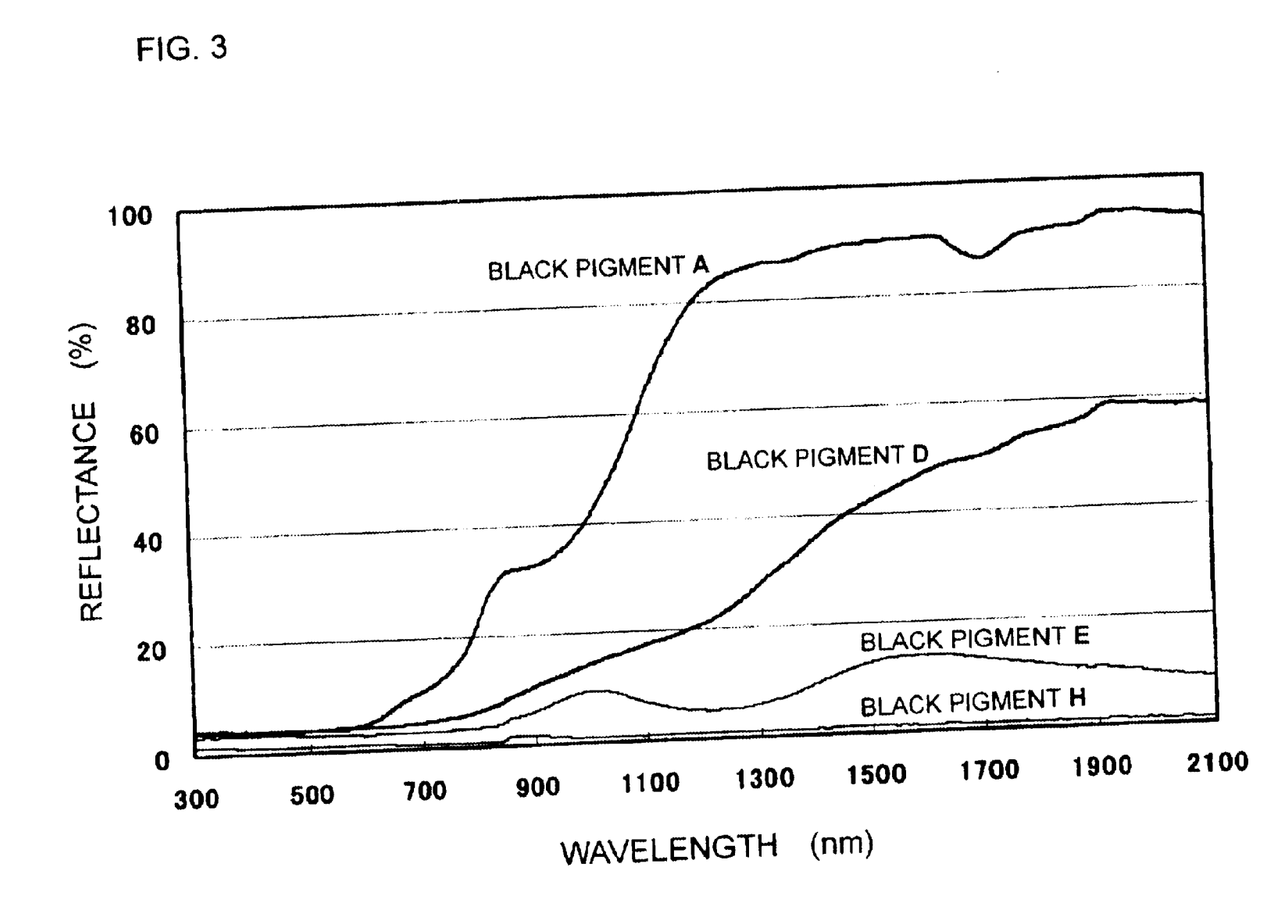
FIG. 3 is a graph showing spectral reflectance profiles of the black pigments in Examples of the present invention and Comparative Examples.

FIG. 3 illustrates spectral reflectance profiles of the pigments A, D, E and H. The pigments A and D exhibit high reflectances in the 780–2,100 nm near infrared region.

Based on the above-measured reflectances in the 780–2,100 nm wavelength region, a solar radiation reflectance of each black pigment was calculated according to the procedure described in JIS A 5759. The calculated solar radiation reflectance of each pigment is as follows.

| | |
|---|---|
| Black Pigment A: | 54% |
| Black Pigment B: | 48% |
| Black Pigment C: | 21% |
| Black Pigment D: | 20% |
| Black Pigment E: | 7% |
| Black Pigment F: | 6% |
| Black Pigment G: | 5% |
| Black Pigment H: | 1% |

EXAMPLE 1

Preparation of a Coating Composition 107 parts by weight of methyl methacrylate-based acrylic resin (nonvolatile content of 25%) and 80 parts by weight of the black pigment A were charged into a container where they were mixed under agitation to homogenity. The resulting mixture was then transferred into a paint shaker where it was allowed to disperse for 2 hours. 127 parts by weight of powedered polyvinylidene fluoride, 110 parts by weight of the aforementioned acrylic resin and 76 parts by weight of isophorone were added with agitation to the above dispersion to prepare a coating composition.

Preparation of a Test Piece

A test piece was prepared according to the following procedure. The above-obtained coating composition was applied onto a substrate, a 0.8 mm thick aluminum sheet, by a bar coater to a dry film thickness of 20 $\mu$m, and then dried at 250° C. for 2 minutes to form a coating film.

Evaluation of a Coating Film

The coating film on the test piece was measured for Munsell system dimensions using a Hunter's color difference meter manufactured by Suga Tester Co., Ltd. and for gloss using a Suga Tester Model UGK-5K gloss meter. Spectral reflectances were also measured to calculate a solar radiation reflectance therefrom. The spectral reflectance measurements were carried out using a Hitachi Model U-3500 spectrophotometer, wherein a high-reflectance white coating composed primarily of barium sulfate was used as a standard (reflectance of 100%).

Based on the spectral reflectances such measured, a solar radiation reflectance of the coating film was calculated in the same manner as used above for the black pigments. The measurement results are shown in Table 1.

Evaluation of Heat Radiation Shielding Capability

Figure 2:
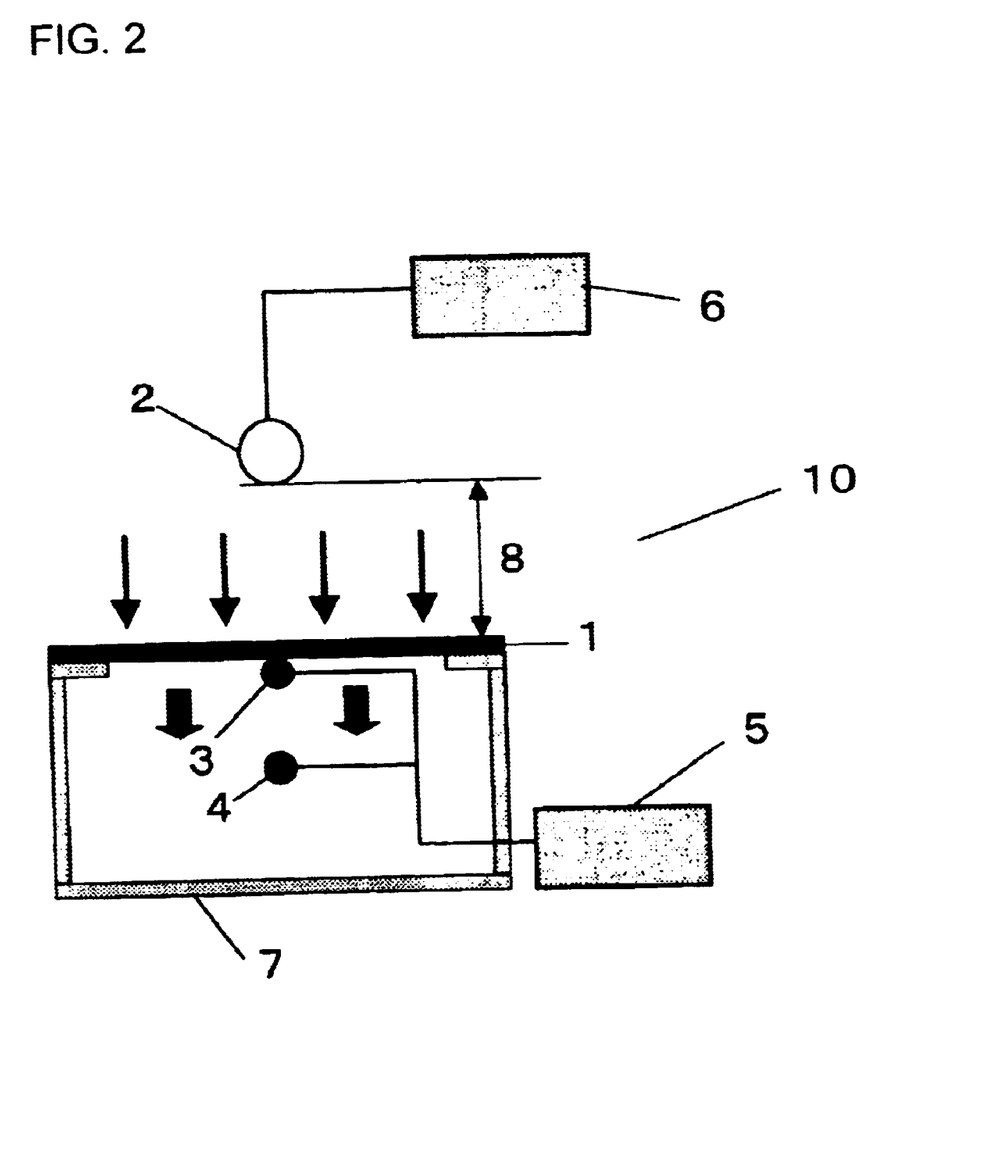
FIG. 2 is a schematic view of the apparatus used to evaluate a heat radiation shielding capability of each coating film.

A test equipment 10 shown in FIG. 2 was utilized to evaluate a heat radiation shielding capability of the aforementioned test piece. Referring to FIG. 2, the test piece 1 was fitted to a top of a polystyrene foam box 7 in such a way that its coating film faced upward. The test piece 1 was exposed to an incandescent lamp 2 located above the test piece 1. Temperature measurement was performed using thermosensors 3 and 4 respectively located below a bottom of the test piece 1 and inside the test box 7. A recorder 5 was used to record the measured temperature.

The incandescent lamp 2 was turned on by electricity supplied from a power source 6.

The test piece 1 measured 320 mm×230 mm in size. Used for the test box 7 was a polystyrene foam box which measured 350 mm×250 mm×250 mm in size and 30 mm in wall thickness. The test piece 1 and the incandescent lamp 2 were spaced apart by a distance 8 of 150 mm.

Figure 1:
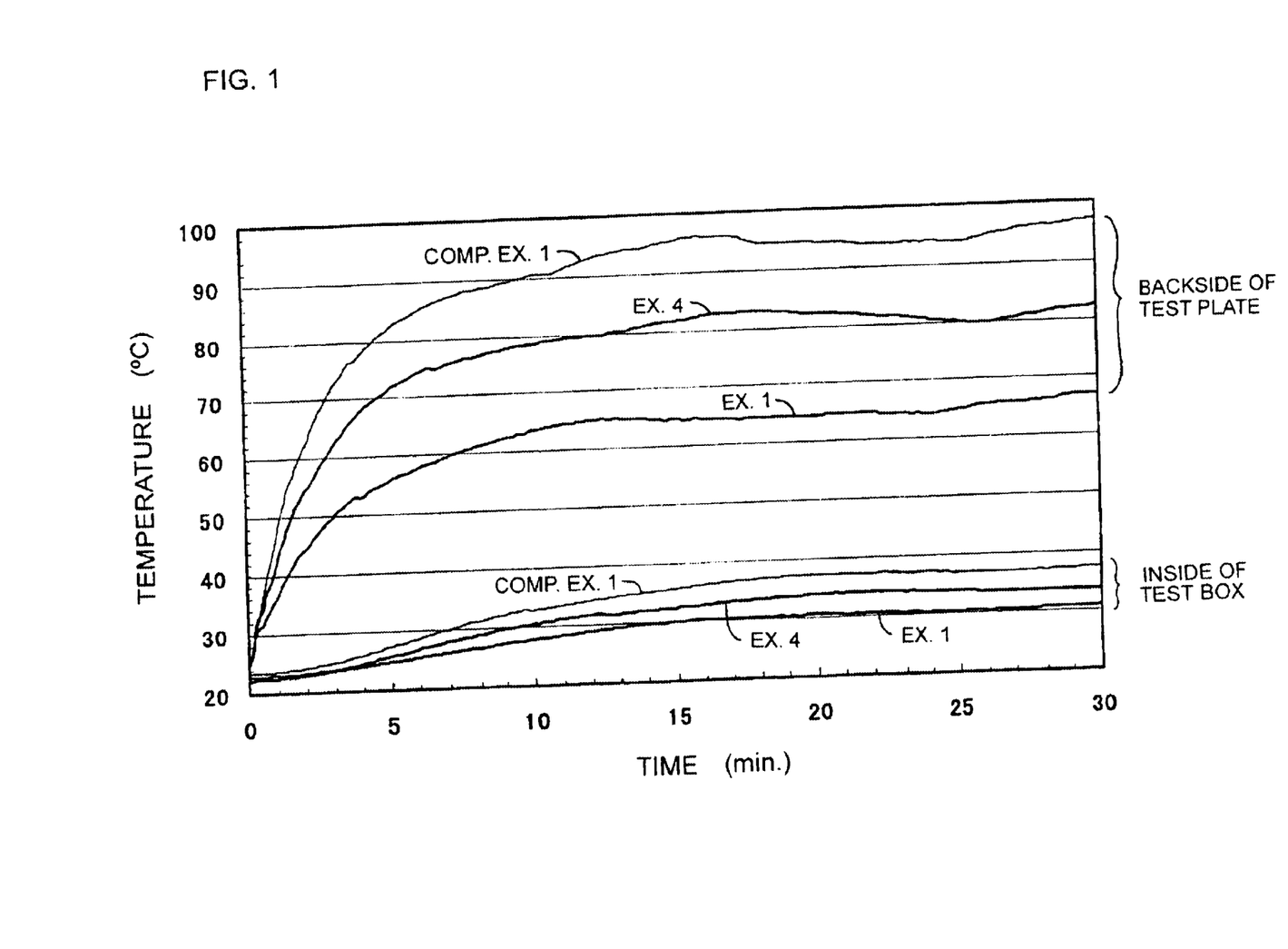
FIG. 1 is a graph showing heat radiation shielding characteristics of respective coating films formed using the coating compositions obtained in Examples of the present invention and Comparative Examples.

A Tabai-Espec Model RT-10 thermorecorder was used for the recorder 5. A Toshiba reflex lamp, RF 110V/200 W, was used for the incandescent lamp 2. Testing was performed under a calm condition within a thermostatic chamber controlled at 20° C. The temperature measurement results are shown in FIG. 1. Table 1 shows the temperature when reached to saturation.

EXAMPLES 2–4

The procedure of Example 1 was followed, except that the black pigments specified in Table 1 were used, to prepare coating compositions. Using each of these coating compositions, the procedure of Example 1 was followed to evaluate a coating film formed on a test piece and a solar radiation shielding capability of the test piece. The results are shown in Table 1. The temperature measurement results of Example 4 are shown in FIG. 1.

EXAMPLE 5

The procedure of Example 4 was repeated to prepare a test piece and evaluate a coating film formed thereon. However, in the evaluation of solar radiation shielding capability, the test piece was exposed outdoor to a natural solar radiation instead of the incandescent lamp. The results are shown in Table 1.

EXAMPLE 6

Figure 4:
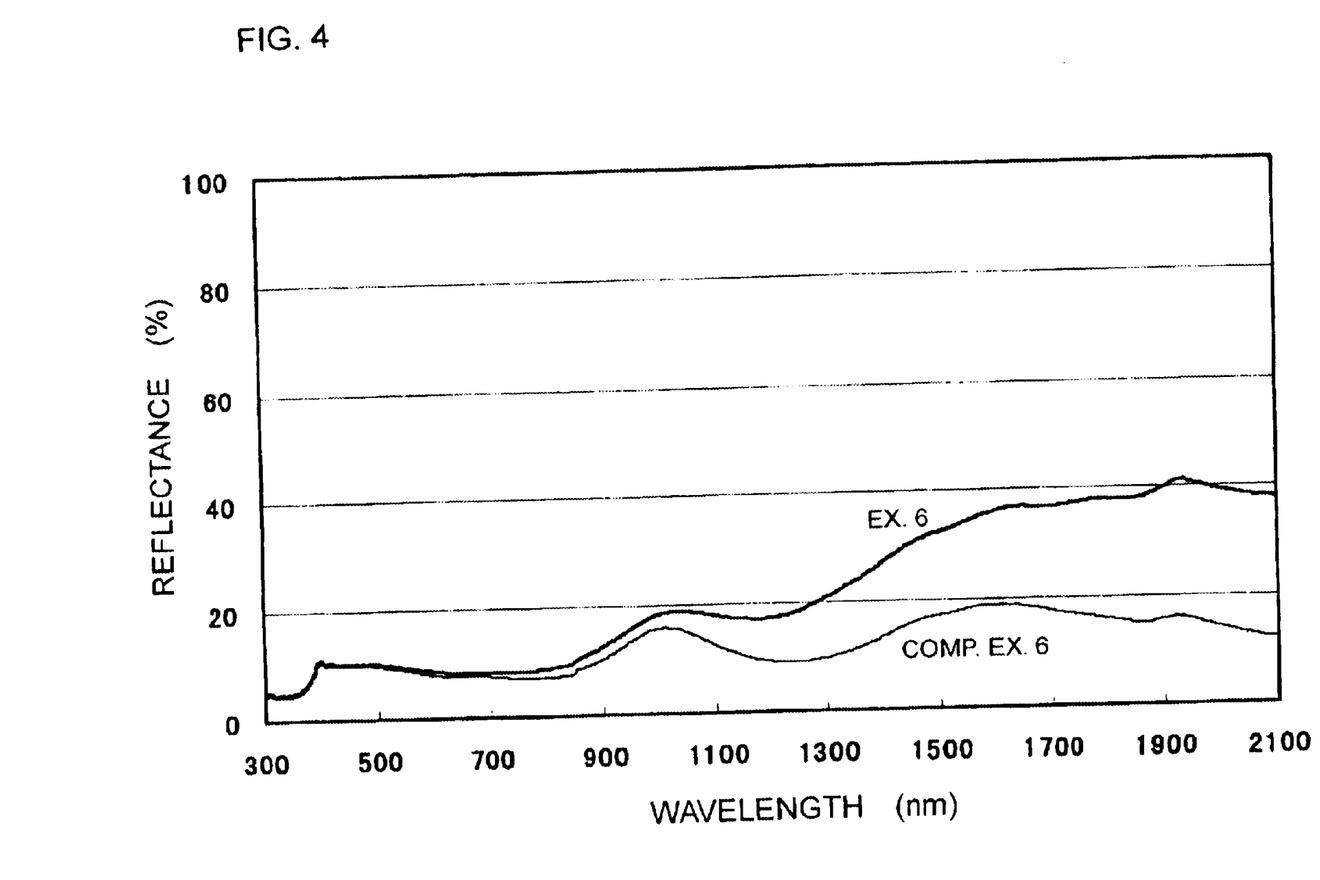
FIG. 4 is a graph showing spectral reflectance profiles of coating films formed using the coating composition obtained in Examples of the present invention and Comparative Examples.

Color coating compositions 1, 2, 3 and 4 were prepared in the similar manner as in Example 1 by using titania (titanium dioxide), ferric oxide, cobalt blue and chrome titanate yellow respectively, instead of using the black pigment A. The color coating compositions 1 to 4 were then mixed with the black coating composition of Example 4 to prepare a gray coating composition having the following Munsell system dimensions; H (hue)=0.19 B, V (value)=3.43 and C (chroma)=0.48. Using this gray coating composition, the procedure of Example 1 was followed to evaluate a coating film formed on a test piece and a solar radiation shielding capability of the test piece. The spectral reflectance profile of the coating film is shown in FIG. 4.

EXAMPLE 7

The color coating compositions 1 to 4 prepared in Example 6 were mixed with the black coating composition of Example 4 to prepare a blue coating composition having the following Munsell system dimensions; H=0.43 PB, V=3.55 and C=0.81. Using this blue coating composition, the procedure of Example 1 was followed to evaluate a coating film formed on a test piece and a solar radiation shielding capability of the test piece.

EXAMPLE 8

The color coating compositions 1 to 4 prepared in Example 6 were mixed with the black coating composition of Example 4 to prepare a rust-colored coating composition having the following Munsell system dimensions; H=2.05 YR, V=2.84 and C=6.01. Using this rust-colored coating composition, the procedure of Example 1 was followed to evaluate a coating film formed on a test piece and a solar radiation shielding capability of the test piece.

EXAMPLES 9

The procedure of Example 1 was followed, except that the coating composition was applied onto a zinc plated steel sheet, to prepare a test piece and evaluate a coating film formed thereon and a solar radiation shielding capability of the test piece.

EXAMPLE 10

The procedure of Example 1 was followed, except that the coating composition was applied to a dry film thickness of 80 μm, to prepare a test piece and evaluate a coating film formed thereon and a solar radiation shielding capability of the test piece.

EXAMPLE 11

195 parts by weight of a polyester resin (nonvolatile content of 65%) and 80 parts by weight of the black pigment A were charged into a container where they were mixed under agitation to homogenity. The resulting mixture was then transferred into a paint shaker where it was dispersed for 2 hours. 78 parts by weight of a methylated melamine resin (nonvolatile content of 70%) and 83 parts by weight of cyclohexanone were added with agitation to the above dispersion to prepare a coating composition. Using this coating composition, the procedure of Example 1 was followed to evaluate a coating film formed on a test piece and a solar radiation shielding capability of the test piece.

EXAMPLE 12

The procedure of Example 11 was followed, except that a flatting agent (NIPSIL E-200 of Nippon Silica Co., Ltd.) was additionally added at a concentration of 5 weight %, to prepare a coating composition. Using this coating composition, the procedure of Example 1 was followed to evaluate a coating film formed on a test piece and a solar radiation shielding capability of the test piece.

COMPARATIVE EXAMPLES 1–4

The procedure of Example 1 was followed, except that the type of the black pigment was changed from A to those specified in Table 2, to prepare coating compositions. Using each of these coating compositions, the procedure of Example 1 was followed to evaluate a coating film formed on a test piece and a solar radiation shielding capability of the test piece. In FIG. 1, the heat radiation shielding characteristics of the test piece of Comparative Example 1 are shown.

COMPARATIVE EXAMPLE 5

The procedure of Example 1 was followed, except that the type of the black pigment was changed from A to E, to prepare a test piece and evaluate a coating film formed thereon. However, in the evaluation of solar radiation shielding capability, the test piece was exposed outdoor to a natural solar radiation instead of the incandescent lamp.

COMPARATIVE EXAMPLE 6

The procedure of Example 6 was followed, except that the black coating composition of Comparative Example 1 was used, to prepare a gray coating composition. Using this gray coating composition, the procedure of Example 1 was followed to evaluate a coating film formed on a test piece and a solar radiation shielding capability of the test piece. The spectral reflectance profile of the coating film is shown in FIG. 4.

COMPARATIVE EXAMPLE 7

The procedure of Example 7 was followed, except that the black coating composition of Comparative Example 1 was used, to prepare a blue coating composition. Using this blue coating composition, the procedure of Example 1 was followed to evaluate a coating film formed on a test piece and a solar radiation shielding capability of the test piece.

COMPARATIVE EXAMPLE 8

The procedure of Example 8 was followed, except that the black coating composition of Comparative Example 1 was used, to prepare a rust-colored coating composition. Using this rust-colored coating composition, the procedure of Example 1 was followed to evaluate a coating film formed on a test piece and a solar radiation shielding capability of the test piece.

COMPARATIVE EXAMPLE 9

The procedure of Example 1 was followed, except that the black coating composition of Comparative Example 1 was applied onto a zinc plated steel sheet, to prepare a coating composition. Using this coating composition, the procedure of Example 1 was followed to evaluate a coating film formed on a test piece and a solar radiation shielding capability of the test piece.

COMPARATIVE EXAMPLE 10

The procedure of Example 1 was followed, except that the black coating composition of Comparative Example 1 was applied to a dry film thickness of 80 μm, to prepare a coating composition. Using this coating composition, the procedure of Example 1 was followed to evaluate a coating film formed on a test piece and a solar radiation shielding capability of the test piece.

COMPARATIVE EXAMPLE 11

The procedure of Example 11 was followed, except that the type of the black pigment was changed from A to E, to prepare a coating composition. Using this coating composition, the procedure of Example 1 was followed to evaluate a coating film formed on a test piece and a solar radiation shielding capability of the test piece.

COMPARATIVE EXAMPLE 12

The procedure of Comparative Example 11 was followed, except that a flatting agent (NIPSIL E-200 of Nippon Silica Co., Ltd.) was additionally added in a concentration of 5 weight %, to provide a coating composition. Using this coating composition, the procedure of Example 1 was followed to evaluate a coating film formed on a test piece and a solar radiation shielding capability of the test piece.

and D exhibit reflectances of not less than 8% relative to a solar radiation in the 780–2,100 nm wavelength region. Also, the coatings incorporating such black pigments exhibit higher solar radiation reflectance values in the 780–2,100 nm wavelength region than comparative coatings.

TABLE 1

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Black Pigment | Designation | A | B | C | D | D | D | D | D | A | A | A | A |
| | Solar Radiation Reflectance (%) | 54 | 48 | 21 | 20 | 20 | 19 | 29 | 52 | 54 | 54 | 54 | 54 |
| Coating Composition | Ratio of Black to Other Pigment | 100/0 | 100/0 | 100/0 | 100/0 | 100/0 | 53/47 | 16/84 | 8/92 | 100/0 | 100/0 | 100/0 | 100/0 |
| | Type of Resin | Fluoro | Fluoro | Fluoro | Fluoro | Fluoro | Fluoro | Fluoro | Fluoro | Fluoro | Fluoro | Polyester | Polyester |
| | Substrate | Aluminum | Aluminum | Aluminum | Aluminum | Aluminum | Aluminum | Aluminum | Aluminum | Zinc Plated Steel | Aluminum | Aluminum | Aluminum |
| Coating Film | Solar Radiation Reflectance (%) | 54 | 48 | 21 | 20 | 20 | 22 | 29 | 52 | 54 | 54 | 55 | 56 |
| | Hue | Dark Brown | Dark Brown | Black | Black | Black | Gray | Blue | Rust | Dark Brown | Dark Brown | Dark Brown | Dark Brown |
| | Gloss (60° Gloss) | 50 | 48 | 48 | 49 | 50 | 49 | 47 | 47 | 50 | 50 | 84 | 21 |
| | Thickness (μm) | 20 | 20 | 20 | 20 | 20 | 20 | 20 | 20 | 20 | 80 | 20 | 20 |
| | Radiation Source | Lamp | Lamp | Lamp | Lamp | Sun | Lamp | Lamp | Lamp | Lamp | Lamp | Lamp | Lamp |
| Temperature | Back of Substrate (° C.) | 67 | 70 | 83 | 86 | 64 | 81 | 75 | 66 | 74 | 66 | 68 | 66 |
| | Inside of Box (° C.) | 31 | 32 | 34 | 34 | 30 | 34 | 33 | 31 | 33 | 30 | 31 | 31 |

TABLE 2

| | | Example | | | | | | | | | | | |
|---|---|---|---|---|---|---|---|---|---|---|---|---|---|
| | | 1 | 2 | 3 | 4 | 5 | 6 | 7 | 8 | 9 | 10 | 11 | 12 |
| Black Pigment | Designation | E | F | G | H | E | E | E | E | E | E | E | E |
| | Solar Radiation Reflectance (%) | 7 | 6 | 5 | 1 | 7 | 12 | 20 | 29 | 7 | 7 | 7 | 7 |
| Coating Composition | Ratio of Black to Other Pigment | 100/0 | 100/0 | 100/0 | 100/0 | 100/0 | 51/49 | 15/85 | 8/92 | 100/0 | 100/0 | 100/0 | 100/0 |
| | Type of Resin | Fluoro | Fluoro | Fluoro | Fluoro | Fluoro | Fluoro | Fluoro | Fluoro | Fluoro | Fluoro | Polyester | Polyester |
| | Substrate | Aluminum | Aluminum | Aluminum | Aluminum | Aluminum | Aluminum | Aluminum | Aluminum | Zinc Plated Steel | Aluminum | Aluminum | Aluminum |
| Coating Film | Solar Radiation Reflectance (%) | 7 | 6 | 5 | 1 | 7 | 12 | 20 | 29 | 7 | 7 | 6 | 7 |
| | Hue | Black | Black | Black | Black | Black | Gray | Blue | Rust | Black | Black | Black | Black |
| | Gloss (60° Gloss) | 51 | 47 | 45 | 49 | 51 | 48 | 50 | 46 | 50 | 51 | 83 | 22 |
| | Thickness (μm) | 20 | 20 | 20 | 20 | 20 | 20 | 20 | 20 | 20 | 80 | 20 | 20 |
| | Radiation Source | Lamp | Lamp | Lamp | Lamp | Sun | Lamp | Lamp | Lamp | Lamp | Lamp | Lamp | Lamp |
| Temperature | Back of Substrate (° C.) | 96 | 98 | 99 | 103 | 70 | 91 | 85 | 75 | 104 | 96 | 97 | 96 |
| | Inside of Box (° C.) | 37 | 38 | 38 | 40 | 34 | 36 | 35 | 33 | 41 | 36 | 38 | 37 |

FIG. 1 is a graph, showing the temperature profiles obtained for the test pieces of Examples 1 and 4 and Comparative Example 1. As shown in FIG. 1, with the use of either test piece, the temperature either at the back of the test piece or inside the test box increases with time and reaches to saturation after some time. The saturation temperature at the back of the test piece of Example 1 or 4 is about 29° C. or 13° C. lower than at the back of the test piece of Comparative Example 1. Also, the saturation temperature inside the test box when incorporating the test piece of Example 1 or 4 is about 6° C. or 3° C. lower than when incorporating the test piece of Comparative Example 1.

The saturation temperatures obtained for different test pieces are given in Tables 1 and 2. As can be seen from the results given in Tables 1 and 2, the black pigments A, B, C and D exhibit reflectances of not less than 8% relative to a solar radiation in the 780–2,100 nm wavelength region. Also, the coatings incorporating such black pigments exhibit higher solar radiation reflectance values in the 780–2,100 nm wavelength region than comparative coatings.

With the use of any one of the Example test pieces, the saturation temperature, either at the back of the substrate (test piece) or inside the test box, was observed to be lower than with the use of the corresponding (in hue of the coating film) Comparative Example test piece. Particularly, this difference in saturation temperature inside the test box therebetween varies depending upon the color hue of the corresponding coating films and becomes larger, about 2–9° C., when their color hue is darker. In buildings such as houses or warehouses, such temperature difference provides a substantial effect on comfort of a residential space, indoor air-conditioning efficiency and storage of articles. It has been thus confirmed that the coating films of Examples have excellent heat or solar radiation shielding capabilities.

Due to the inclusion of a specific composition of black pigment, the coating composition of the present invention can provide a coating film having excellent heat radiation shielding capability.

What is claimed is:

1. A heat radiation shield plate comprising:

a metal substrate, and a heat radiation shield coating film formed by applying a coating composition to said substrate, said coating composition containing a black calcined pigment which contains $Fe_2O_3$ and also $Cr_2O_3$ and/or $Mn_2O_3$ in a total amount of 20–100% by weight; a binder component, a curing agent, and a solvent; said black pigment exhibiting a reflectance of not higher than 15% relative to a radiation at any wavelength in the 400–700 nm visible region and a reflectance of not below 8.0% relative to a solar radiation in the 780–2100 nm wavelength region.

2. The heat radiation shield plate of claim 1, wherein said black pigment is contained in the amount of not less than 0.1% by weight.

3. The heat radiation shield plate of claim 1, wherein said black pigment is contained in the amount of not less than 0.5%, based on the total weight of all pigments.

4. The heat radiation shield plate of claim 1, wherein said coating composition contains a polyester, acrylic, fluoro or chloro resin as said binder component.

5. The heat radiation shield plate of claim 4, wherein said coating composition contains a melamine resin and/or blocked isocyanate as said curing agent.

6. A heat radiation shield coating composition comprising:

0.1 wt% or more black pigment, a binder component and a curing agent, said black pigment comprising 20–100 wt% of a calcined pigment comprising $Fe_2O_3$ and $Cr_2O_3$ and/or $Mn_2O_3$ which exhibits a reflectance of not below 8.0% relative to a solar radiation in the 780–2,100 nm wavelength region and a reflectance of not higher than 15% relative to a radiation at any wavelength in the 400–700 nm visible region.

7. The heat radiation shield coating composition of claim 6, wherein the binder component is selected from the group consisting of polyester, acrylic, fluoro and chloro resins.

8. The heat radiation shield coating composition of claim 7, wherein the curing agent is selected from the group consisting of melamine resin, isocyanate and blocked isocyanate.

9. The heat radiation shield coating composition of claim 8, further comprising a filler.

10. The heat radiation shield coating composition of claim 9, wherein said filler comprises fine particles, said fine particles consisting essentially of $SiO_2$, $TiO_2$, $Al_2O_3$, $Cr_2O_3$, $ZrO_2$, $Al_2O_3 \cdot SiO_2$, $3Al_2O_3 \cdot 2SiO_2$; zirconia silicate, fibrous glass and particulate glass.

11. The heat radiation shield coating composition of claim 6, wherein said calcined pigment comprises 30–100 wt % of the black pigment.

12. The heat radiation shield coating composition of claim 6, wherein said black pigment comprises at least 0.5 wt % based on a total weight of all pigment components.

13. The heat radiation shield coating composition of claim 6, wherein the black pigment comprises 15–75 wt % of $Fe_2O_3$ and 25–60 wt % of $Cr_2O_3$.

14. The heat radiation shield coating composition of claim 13, wherein said black pigment further comprises 15–20 wt % of $Mn_2O_3$.

15. The heat radiation shield coating composition of claim 6, further comprising a solvent selected from the group consisting of toluene, xylene, ethyl acetate, butyl acetate, methylethyl ketone, methylisobutyl ketone, cyclohexanone, isophorone and water.

* * * * *